United States Patent
Tabei et al.

[11] 4,010,150
[45] Mar. 1, 1977

[54] RED COPPER COMPLEXES OF DISAZO COMPOUNDS CONTAINING TRIAZINE GROUPS

[75] Inventors: Tooru Tabei, Ohmiya; Yasuhiko Arisaka, Yono; Yutaka Iizuka, Mitaka, all of Japan

[73] Assignee: Nippon Kayaku Kabushiki Kaisha, Tokyo, Japan

[22] Filed: Dec. 4, 1973

[21] Appl. No.: 421,581

[30] Foreign Application Priority Data

Dec. 6, 1972 Japan .......................... 47-121694
Dec. 9, 1972 Japan .......................... 47-123701
July 10, 1973 Japan .......................... 48-77066
July 19, 1973 Japan .......................... 48-82271

[52] U.S. Cl. .................... 260/146 T; 260/151; 260/153; 260/196; 260/198; 260/205
[51] Int. Cl.² ............... C09B 45/28; C09B 62/08; D06P 1/10; D06P 3/60
[58] Field of Search ................ 260/146 T, 153

[56] References Cited

UNITED STATES PATENTS

| 1,667,312 | 4/1928 | Fritzsche et al. | 260/153 |
| 1,779,298 | 10/1930 | Straub et al. | 260/146 T |
| 2,467,621 | 4/1949 | Kaiser et al. | 260/153 |
| 2,538,568 | 1/1951 | Kaiser et al. | 260/146 T |
| 2,763,640 | 9/1956 | Riat et al. | 260/148 |
| 2,835,663 | 5/1958 | Benz | 260/153 |

FOREIGN PATENTS OR APPLICATIONS

| 631,793 | 11/1961 | Canada | 260/146 T |
| 697,416 | 9/1953 | United Kingdom | 260/146 T |

*Primary Examiner*—Floyd D. Higel
*Attorney, Agent, or Firm*—Lane, Aitken, Dunner & Ziems

[57] ABSTRACT

Lightfast and waterfast azo dyes suitable for dyeing fibers and paper, particularly cellulosic materials, and having the following formula:

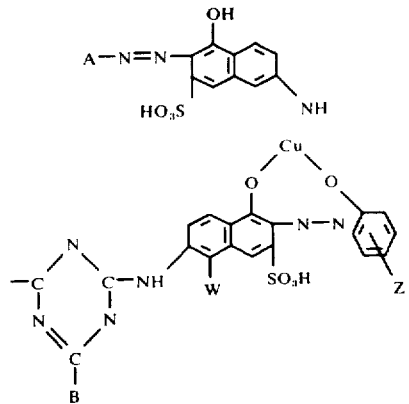

wherein
A is a group selected from 4-methoxy-2-sulfophenyl, 4-methoxy-3-sulfophenyl, 2- or 3-sulphonyl, tolyl, 4-nitro-2,2'-disulfostilbyl, sulfonaphthyl and 4-(4-sulfophenylazo)-2-sulfophenyl;
B is selected from monoethanolamino, diethanolamino, morpholino, and N-methylamino;
W is hydrogen or sulfonic acid; and
Z is sulfonic acid attached at the meta or para position relative to the pendant diazo.

13 Claims, No Drawings

RED COPPER COMPLEXES OF DISAZO COMPOUNDS CONTAINING TRIAZINE GROUPS

DETAILED DESCRIPTION OF THE INVENTION

This invention relates to azo dyes and more particularly, to novel red azo dyes which have excellent fastness to water and light as well as in dyeing affinity and solubility in liquids, and a method for the preparation of such dyes.

Several red direct dyes which have excellent wet fastness are used in the art (for example, in U.S. Pat. No. 1,509,442). In general, however, such direct cotton dyes are defective in other important properties such as dyeing affinity and/or solubility in liquids, so that they have only limited uses. Accordingly, there has been a strong demand for red azo dyes having excellent solubility and dyeing affinity as well as wet fastness.

It is therefore an object of the present invention to provide azo dyes which will overcome the above-mentioned defects.

It is a further object of the present invention to provide azo dyes which have excellent wet fastness and a red color which can serve as one of the primary colors.

It is another object of the present invention to provide water-soluble red azo dyes.

It is still another object of the present invention to provide a method for the preparation of red azo dyes of the nature as mentioned above.

According to the present invention, there are provided red azo dyes having the following formula (1)

hydroxyl group, sulfonamide group, acetylamino group, nitro group, carboxyl group and benzothiazole residue; however, no substitutent which is capable of forming a copper complex, such as a hydroxyl group, carboxyl group, methoxy group, ethoxy group or the like should be present in ortho position to the amino group of the benzene nucleus to be diazotized); a naphthalene ring substituted with sulfonic acid group; stilbene having sulfonic acid group and nitro group; and azobenzene or benzeneazonaphthalene with or without sulfonic acid group, acetylamino group, methyl group and/or methoxy group; Y represents an alkylamino group containing 1 to 3 carbon atoms, an alkanolamino group containing 2 to 3 carbon atoms, an amino group, $-HNCH_2COOH$, $-NHCH_2CH_2SO_3H$, a morpholine residue, an aniline or phenol residue with or without an alkyl group containing 1 or 2 carbon atoms, an alkoxyl group containing 1 to 2 carbon atoms, chlorine, an amino group, acetylamino group, sulfonic acid group, or sulfonamide group, N-methylaniline residue, or a naphthylamine residue having a substituted sulfonic acid group; W represents hydrogen or a sulfonic acid group; Z represents a sulfonic acid group attached to the meta or para position to the azo group; and $R_1$ and $R_2$ independently represent hydrogen or a methyl. In this connection, though the azo dyes of formula (1) are expressed in the form of free sulfonic acid, the same may be in the form of a sulfonate such as of an alkali metal including sodium, potassium, or the like, or ammonium.

More particularly, among the dyes of formula (1),

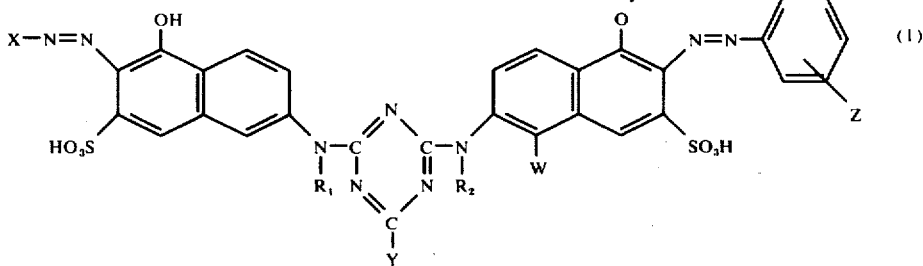

wherein X represents a benzene nucleus with or without one or more of substituents selected from the group consisting of an alkyl group containing 1 or 2 carbon atoms, an alkoxyl group containing 1 to 2 carbon atoms, chlorine, sulfonic acid group, amino group, higher wet fastness (according to JIS L 0844 A-4 method) is obtained with sulfonic acid dyes represented by the following formula (2) in the form of a free acid, i.e.,

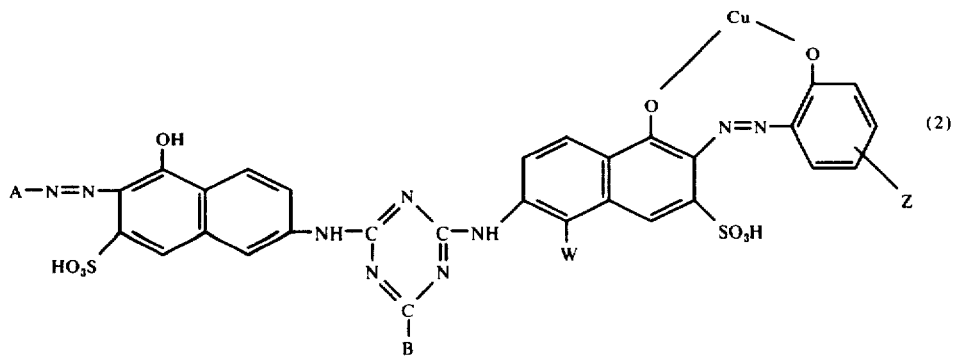

wherein A represents a 4-methoxy-2-sulfophenyl group, 4-methoxy-3-sulfophenyl group, 2- or 3-sulfophenyl group, tolyl group, 4-nitro-2,2'-disulfostilbyl group, sulfonaphthyl group or 4-(4'-sulfophenylazo)-2-sulfophenyl group; B represents a monoethanolamine group, diethanolamine group, morpholino group, or N-methylamino group; W represents hydrogen or a sulfonic acid group; and Z represents a sulfonic acid group attached to the meta or para position to the azo group).

The novel dyes of formula (1) can be obtained by any of the following methods A, B and C:

(A) Subjecting to a condensation reaction, in the presence of an acid combining agent, 1 part by mole ratio of a cyanuric halide, such as cyanuric chloride, cyanuric bromide or the like with 1 part by mole ratio of a compound in the form of a free acid having the following formula (3)

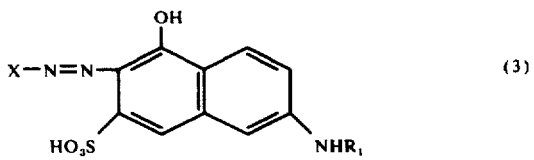

(wherein X and $R_1$ respectively have the same meanings as previously defined), and then with 1 part by mole ratio of an aminoazo compound in the form of a free acid having the following formula (4)

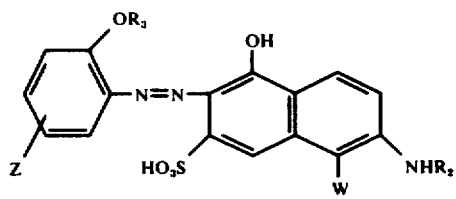

(wherein $R_3$ represents hydrogen a or methyl group, and W, $R_2$ and Z have the same meanings as previously given, and finally with 1 part by mole ratio of a compound represented by the following formula (5)

YH            (5)

wherein Y has the same meaning as previously given, and then treating the resultant condensate with a copper-yielding agent to form the copper complex salt thereof.

(B) A second method involving the condensation reaction, in the presence of an acid combining agent, of 1 part by mole ratio of a cyanuric halide with the compound of formula (3) and 1 part by mole ratio of a compound in the form of a free acid having the following formula (6)

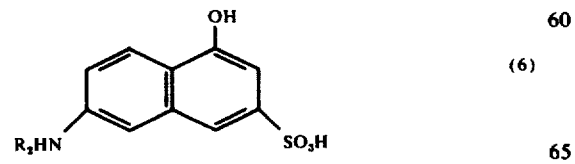

(wherein $R_2$ has the same meaning as previously given), the order of condensation of the compounds of formula (3) and (6) being arbitrarily selected, and coupling the resultant condensate, after or before further condensation with 1 part by mole ratio of the afore-mentioned formula (5), and with a diazo compound of the amine of the following formula (7)

(wherein Z represents a sulfonic acid group attached at the meta or para position to the amino group, and $R_3$ represents hydrogen or methyl), and treating the resultant condensate with a copper-yielding agent for producing the copper complex salt thereof.

(C) In a third method 1 part by mole ratio of a cyanuric halide is reacted with the compound of the aforementioned formula (4) and a compound having the following formula (8) each in an amount of 1 part by mole ratio, each reactant being introduced in an arbitrary order

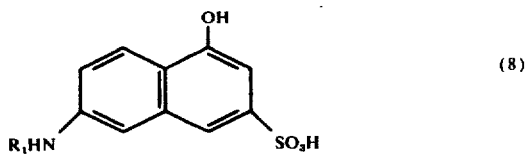

(wherein $R_1$ has the same meaning as defined hereinbefore), and the resultant condensate is then coupled with 1 part by mole ratio of a diazo compound having the following formula (9)

XNH$_2$            (9)

(wherein X has the same meaning as defined hereinbefore), before or after further condensation of the condensate with the compound of formula (5), and then treating the coupled compound with a copper-yielding agent for producing the copper complex salt thereof.

(D) A method involving condensing, in the presence of an acid combining agent 1 part by mole ratio of a cyanuric halide such as cyanuric chloride or cyanuric bromide successively with, 1 part by mole ratio of a compound having the following formula (4')

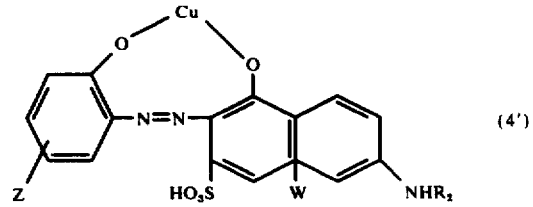

(wherein W, $R_2$ and Z have the same meanings as defined hereinbefore, respectively), 1 part by mole ratio of the compound of the afore-mentioned formula (3), and then with 1 part by mole ratio of the afore-mentioned formula (5), and (E) A method of condensing 1 part by mole ratio of a cyanuric halide with 1 part by mole ratio of the compounds of the afore-mentioned formulas (4') and (8), respectively, the compounds being subjected to the condensation reaction in an arbitrary order, and coupling the resultant condensate with the diazo compound of the aforementioned formula (9) before or after further condensation with the compound of the formula (5).

It should be noted that the condensation, coupling and copper complex-producing reactions can be conducted in a conventional manner, and accordingly, more specific reaction conditions are not shown herein. It should be also noted that though the respective compounds of formulas (1) through (9) are shown in their free acid form, they may also be in the form of a metal salt such as of an alkali metal or ammonium.

Examples of the reactant represented by YH in formula (5) include monomethylamine, monoethylamine, monopropylamine, dimethylamine, monoethanolfoamide, 2-methylaniline, 3-methylaniline, 4-methylaniline, 3-ethylaniline, 4-ethylaniline, 2,4-dimethylaniline, 3-methoxyaniline, 4-methoxyaniline, 4-methoxyaniline-3-sulfonic acid, 4-methoxyaniline-2-sulfonic acid, 3-ethoxyaniline, 4-ethoxyaniline, 2-methylaniline-4-sulfonic acid, 4-methylaniline-2-sulfonic acid, 2.4-dimethylaniline-5-sulfonic acid, 1.4-phenylenediamine-2-sulfonic acid, 4-acetylaminoaniline, 3-acetylaminoaniline-6-sulfonic acid, 4-acetylaminoaniline-2-sulfonic acid, 4-nitro-4'-aminostilbene-2.2'-disulfonic acid, dehydrothio-p-toluidine, dehydrothio-p-toluidinemonosulfonic acid, dehydrothio-p-toluidinedisulfonic acid, 1-naphthylamine, 1-naphthylamine-4-sulfonic acid, 1-naphthylamine-5-sulfonic acid, 1-naphthylamine-7-sulfonic acid, 2-naphthylamine-1-sulfonic acid, 2-naphthylamine-6-sulfonic acid, 2-naphthylamine-4.8-disulfonic acid,

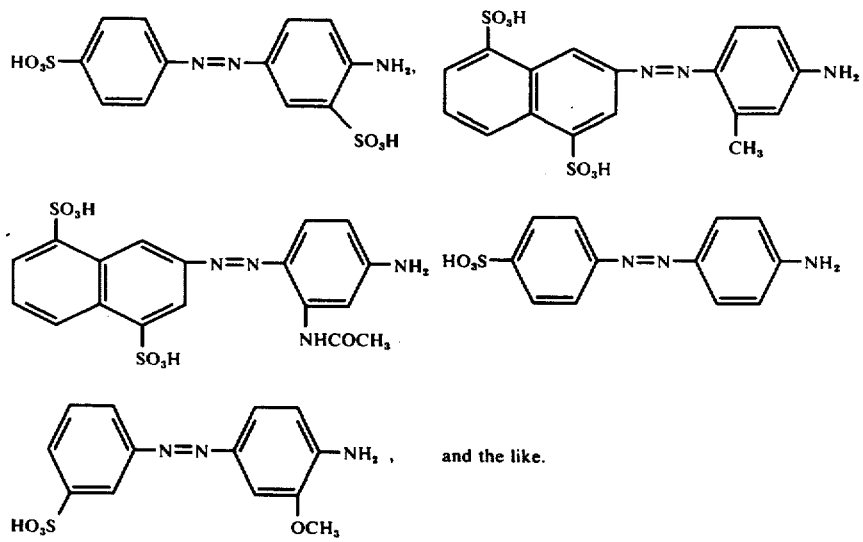

amine, diethanolamine monopropanolamine, aniline, o-methylaniline, m-methylaniline, p-methylaniline, o-ethylaniline, m-ethylaniline, p-ethylaniline, o-methoxyaniline, m-methoxyaniline, p-methoxyaniline, o-ethoxyaniline, m-ethoxyaniline, p-ethoxyaniline, N-methylaniline, N-methyl-4-methylaniline, m-chloroaniline, p-chloroaniline, 4-chloroaniline-3-sulfonic acid, aniline-3-sulfonic acid, aniline-4-sulfonic acid, aniline-ω-methanesulfonic acid, 4-aminoaniline-2-sulfonic acid, 4-acetylaminoaniline-2-sulfonic acid, 3-acetylaminoaniline-6-sulfonic acid, 2-methylaniline-4-sulfonic acid, 3-aminobenzenesulfonamide, 4-aminobenzenesulfonamide, 1-naphtylamine-4-sulfonic acid, 1-naphthylamine-5-sulfonic acid, 1-naphthylamine-6-sulfonic acid, 1-naphthylamine-7-sulfonic acid, phenol, 2-methylphenol, 3-methylphenol, 4-methylphenol, 3-chlorophenol, 4-chlorophenol, phenol-4-sulfonic acid, phenol-3-sulfonic acid, 3-aminophenol, 4-aminophenol and the like.

Examples of the reactants represented by X—NH₂ in formula (9) include aniline, 2-chloroaniline, 3-chloroaniline, 4-chloroaniline, 4-chloroaniline-2-sulfonic acid, 2-nitroaniline, 3-nitroaniline, 4-nitroaniline, 4-nitroaniline-2-sufonic acid, 3-carboxyaniline, 4-carboxyaniline, 3-carboxyaniline-4-sulfonic acid, 4-hydroxyaniline-3-sulfonic acid, aniline-2-sulfonic acid, aniline-3-sulfonic acid, aniline-4-sulfonic acid, aniline-2,5-disulfonic acid, aniline-4-sulfoamide, aniline-3-sul- The novel red azo dyes of the present invention expressed by the afore-mentioned formula (1) are water-soluble and have excellent affinity for materials such as fibres and paper, particularly with cellulose materials. Furthermore, materials dyed with the red azo dyes of the present invention have excellent fastness to light, and particularly wet fastness, as compared with materials dyed with use of known red direct dyes.

In dyeing fibrous materials with the dyes of the present invention, any conventional dyeing process such as a dip dyeing process, a continuous dyeing process, or a printing process may be employed. With the dip dyeing process, for example, the dye of formula (1) of the present invention is added to a dyeing bath which contains a 5 – 30% sodium chloride or calcined Glauber's salt aqueous solution in an amount 3 – 60 times the amount of a fibrous material to be dyed. Then, the fibrous material is dipped in the dyeing bath, which is heated and agitated at 50° – 130° C for 30 – 120 min. In the dip dyeing process, a dyeing assistant may be added to the dyeing bath, if desired. With the continuous dyeing process, a fibrous material is padded by passing it through an aqueous solution of the dye of formula (1), followed by either batching the padded fibrous material at room temperature for 2 – 24 hours, by subjecting the resultant fibrous material to steaming at a temperature of 100° – 150° C for a short period of time, or by treating the resultant fibrous material in a 5

— 10% sodium chloride or calcined Glauber's salt aqueous solution, which is heated at 80° – 100° C, for fixing the dye in or on the fibrous material. As necessary, the padding solution may contain the usual additives such as urea, a penetrating agent, and/or a reduction inhibitor. With the printing process, a color paste is first prepared with use of the dye of formula (1), a thickening agent and additives such as a reduction inhibitor, a solubilizer and the like. Then, the color paste is printed upon a fibrous material, followed by steaming the printed material at 100° – 150° C for 5 – 60 min. to fix the dye.

The materials dyed by any of the above-mentioned processes can be further improved in wash fastness and water fastness by fixing the dye with use of a commercially available fixing agent.

The present invention will be more particularly illustrated by the following examples. In the examples, parts or percentages are of proportions by weight.

EXAMPLE 1

3.7 parts of cyanuric chloride was added to a mixture of 50 parts of ice water and 0.1 part of Liponox RNA (a non-ionic active agent produced by The Lion Fat & Oil Co., Ltd.) and was dispersed with vigorous agitation. To the resultant solution a solution, which contained 9.06 parts of the aminoazo compound of the following formula (10)

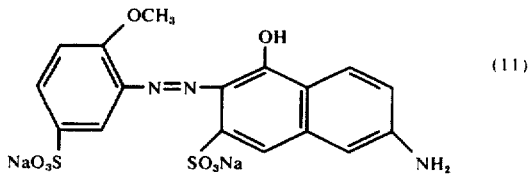

and dissolved in 150 parts of neutral hot water was added to the reaction solution for further reaction while maintaining the temperature at 50° C. Simultaneously, a 10% sodium carbonate solution was added to the reaction solution to maintain the pH value at 3 – 6. When the unreacted aminoazo of formula (11) became undetectable, 3.7 parts of monoethanolamine was further added to the solution and reacted at 90° – 95° C for 3 hours. Thereafter, sodium chloride was added to the reaction system to salt out the product, which was then filtered. The resultant cake-like product was then introduced into 400 parts of water and agitated for a short period of time. The resultant solution was heated to 95° C and was mixed with a solution containing 5.5 parts of crystalline copper sulfate, 30 parts of warm water and 6.1 parts of monoethanolamine, which mixture was allowed to react at 95° C for 3 hours to produce the copper complex salt. After completion of formation of the complex salt, sodium chloride was added to the reaction solution to salt out a dye, which was separated by filtration, dried and pulverized to obtain dark reddish brown powder. The dye had the following formula (12)

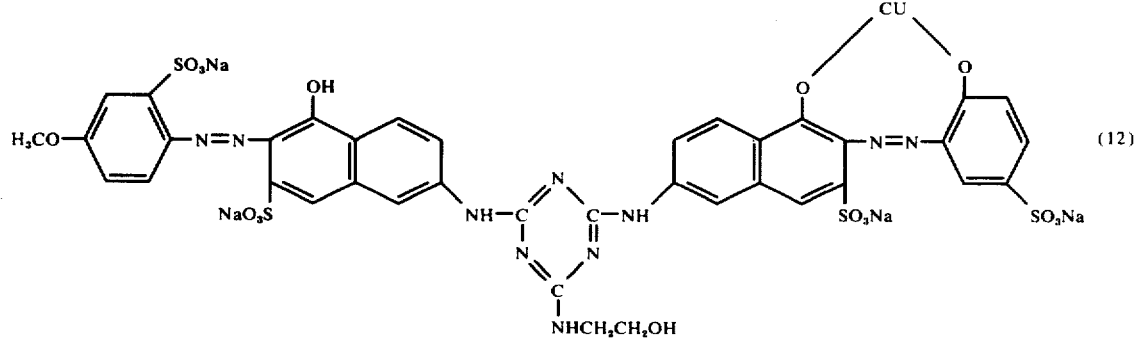

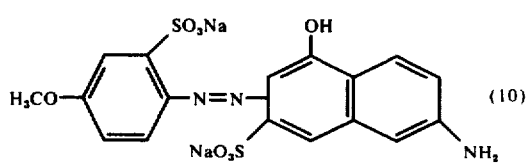

dissolved in 150 parts of neutral water, was added dropwise over a period of 30 – 60 min. while maintaining the reaction temperature at 0° – 5° C. At the same time, a 10% sodium carbonate solution was added dropwise into the solution to maintain the pH value thereof at 3 – 6. The reaction was allowed to proceed continuously for several hours until the unreacted aminoazo compound of formula (10) became undetectable. Then, 9.06 parts of an aminoazo compound having the following formula (11)

The dye showed a dark red color when dissolved in water and a maximum absorbance at a wavelength of 524 mμ (in a 10% pyridiene aqueous solution). Natural and regenerated cellulose such as cotton, flax, linen, viscose and staple fibre, and paper could be dyed to a bluish red color with use of the dye obtained. The resultant dyed materials had excellent wet fastness.

When the above process was repeated using cyanuric bromide instead of cyanuric chloride, similar results were obtained.

EXAMPLES 2 to 20

Example 1 was repeated except that various kinds of starting materials were used for producing the compounds or dyes shown in the Table below in which the respective substituents of general formula 1 are given. Furthermore, the respective dyes obtained were subjected to hue determination using cellulose fibres in accordance with methods as will be described in Examples 23 through 26. The test results are also shown in Table 1.

Table 1

Formula (1)

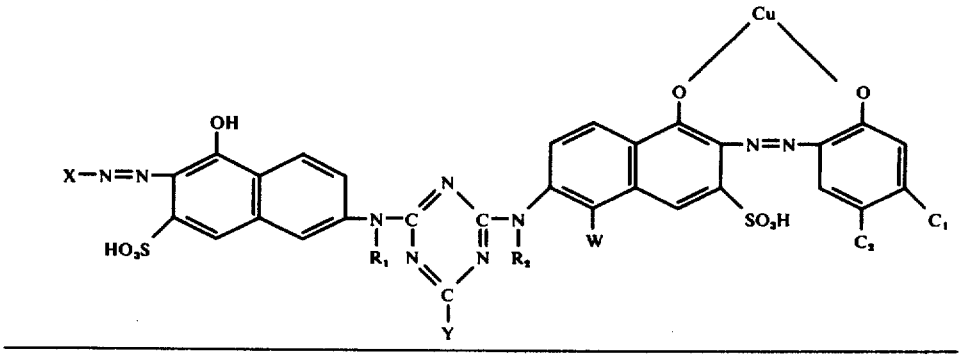

| Ex. No. | Substituent X | Y | $C_1$ | $C_2$ | W | $R_1$ | $R_2$ | Hue |
|---|---|---|---|---|---|---|---|---|
| 2 | 2-CH₃O, 5-SO₃Na phenyl | —N(CH₂CH₂OH)₂ | —H | —SO₃Na | —H | —H | —H | Bluish Red |
| 3 | 2-CH₃O, 5-SO₃Na phenyl | morpholino | —H | —SO₃Na | —H | —H | —H | Bluish Red |
| 4 | 2-CH₃O, 5-SO₃Na phenyl | —NH₂ | —H | —SO₃Na | —H | —H | —H | Bluish Red |
| 5 | 2-CH₃O, 5-SO₃Na phenyl | —NHCH₂COOH | —H | —SO₃Na | —H | —H | —H | Bluish Red |
| 6 | 2-CH₃O, 5-SO₃Na phenyl | —NH-phenyl | —H | —SO₃Na | —H | —H | —H | Bluish Red |
| 7 | 4-H₃CO, 2-SO₃Na phenyl | —N(CH₃)-phenyl | —H | —SO₃Na | —H | —H | —H | Bluish Red |
| 8 | 4-H₃CO, 2-SO₃Na phenyl | —NH-(4-Cl-phenyl) | —H | —SO₃Na | —H | —H | —H | Bluish Red |
| 9 | 4-H₃CO, 2-SO₃Na phenyl | —O-(4-CH₃-phenyl) | —H | —SO₃Na | —H | —H | —H | Bluish Red |

-continued

| Ex. No. | Substituent X | Y | $C_1$ | $C_2$ | W | $R_1$ | $R_2$ | Hue |
|---|---|---|---|---|---|---|---|---|
| 10 | 4-methoxy-2-methylphenyl, with SO₃Na | —NHC₂H₅ | —H | —SO₃Na | —H | —H | —H | Bluish Red |
| 11 | 4-methoxy-2-methylphenyl, with SO₃Na | —NH—(2-methylphenyl) | —H | —SO₃Na | —H | —H | —H | Bluish Red |
| 12 | 4-methoxy-2-methylphenyl, with SO₃Na | —NH—(3-SO₂NH₂-phenyl) | —H | —SO₃Na | —H | —H | —H | Bluish Red |
| 13 | 4-methoxy-2-methylphenyl, with SO₃Na | —HN—(phenyl with SO₃Na and NH₂) | —H | —SO₃Na | —H | —H | —H | Bluish Red |
| 14 | 4-methoxy-2-methylphenyl, with SO₃Na | —NHCH₃ | —H | —SO₃Na | —H | —H | —H | Bluish Red |
| 15 | 4-methoxy-2-methylphenyl, with SO₃Na | —NH—(3-SO₃Na-phenyl) | —H | —SO₃Na | —H | —H | —H | Bluish Red |
| 16 | 4-methoxy-2-methylphenyl, with SO₃Na | —NH—(4-methylphenyl) | —H | —SO₃Na | —H | —H | —H | Bluish Red |
| 17 | 4-chlorophenyl | —NHCH₂CH₂OH | —H | —SO₃Na | —H | —H | —H | Red |
| 18 | 2-amino-4-methylphenyl with SO₃Na | —NHCH₂CH₂OH | —H | —SO₃Na | —H | —H | —H | Bluish Red |
| 19 | 2-hydroxy-4-methylphenyl with SO₃Na | —NHCH₂CH₂OH | —H | —SO₃Na | —H | —H | —H | Bluish Red |

-continued

| Ex. No. | Substituent X | Y | $C_1$ | $C_2$ | W | $R_1$ | $R_2$ | Hue |
|---|---|---|---|---|---|---|---|---|
| 20 | ![X group: 2,4,5-trimethyl-sulfonated phenyl] | $H_3CCONH-\text{C}_6H_4-NH-$ | —H | —$SO_3$Na | —H | —H | —H | Bluish Red |

EXAMPLE 21

Example 1 was repeated except that 4.78 parts of 6-amino-1-naphthol-3-sulfonic acid was used instead of the aminoazo compound of formula (10), to obtain a reaction solution containing 16.5 parts of a compound expressed by the following formula (13)

hours at a pH value of 7 – 8 and then further agitated at room temperature overnight to complete the coupling reaction. Thereafter, the same procedure as in Example 1 was repeated using monoethanolamine and the same copper-yielding agent to obtain the dye of formula (12).

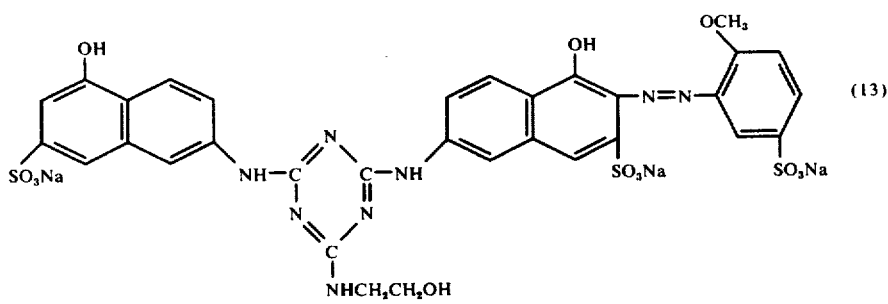

(13)

To the reaction solution was added ice to cool the temperature of the reaction solution to 10° C and a diazo solution, which was obtained from 4.06 parts of 4-methoxyanilin-2-sulfonic acid, for reaction at 10° C with a pH value of 7 – 8 for 3 hours. Thereafter, the reaction solution was agitated at room temperature overnight to complete the coupling reaction. The resultant product was then treated in the same manner as in Example 1 for forming the copper complex salt of the product to obtain the dye of formula (12).

EXAMPLE 22

The same procedure as in Example 1 was repeated except that 4.78 parts of 6-amino-1-naphthol-3-sulfonic acid was used instead of the aminoazo compound of formula (11), to form a reaction solution containing 16 parts of a compound expressed by the following formula (14).

EXAMPLE 23

1 part at the dye of the afore-mentioned formula (12) was mixed with 3 parts of calcined Glauber's salt and 1000 parts of water to prepare a dyeing bath of 50° C. 30 parts of spun viscose rayon clot was immersed in the bath, which was heated up to 90° C over a period of 15 min. The dyeing was continued for an additional 35 min. at 90° C and then the cloth was removed from the bath, washed and dried. The dried spun viscose rayon cloth showed a bluish red color and was excellent in fastness to light and water.

The thus dyed cloth was immersed in a bath, which contained 3 parts of Kayafix CD (a fixing agent produced by NIPPON KAYAKU CO., LTD.) and 1000 parts of water, at 60° C for 20 min., followed by washing and drying. This treatment improved the wet fastness of the cloth without impairing its originally dyed color.

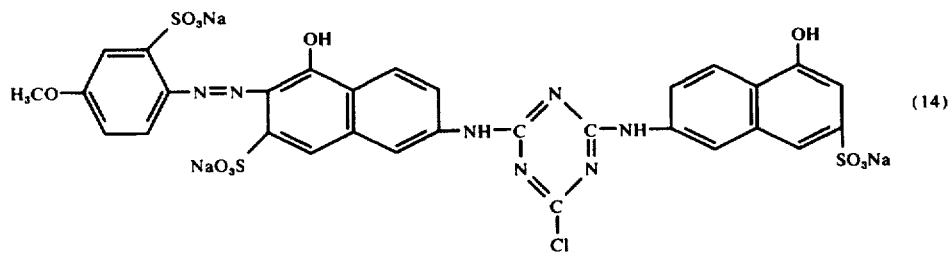

(14)

To the reaction solution was added ice to cool the temperature of the reaction solution to 10° C. A diazo solution, which was formed from 4.06 parts of 2-methoxyaniline-5-sulfonic acid, was then added to the reaction solution, which was agitated at 10° C for 3

The dye of formula (12) had a bluish red color, a high degree of solubility in water (100 g/l) and a high color value. The combination of the dye with other a dispersing dye was suitable for dyeing polyester-cellulose fibre blend in a single bath at high temperature.

The dye of formula (12) was found to belong to class B of the S.D.C., Clasification and to be of a high-temperature exhaustion type.

Viscose rayon which was dyed using the dye of formula (12) to a normal depth had good light fastness (i.e., the rating value of the dyed rayon was 7 when determined in accordance with a method as prescribed in Japanese Industrial Standards L-0841), and good in wash fastness (i.e., the change in a value of shade was 4 and the staining value was 3 - 4 when determined in accordance with a testing method using white viscose rayon as prescribed in Japanese Industrial Standards L-0844 A-2). Then, the dyed rayon was subjected to a fixing treatment using a polyamine-base fixing agent, Kayafix CD (produced by NIPPON KAYAKU CO., LTD.). The resultant rayon had excellent wash fastness (i.e., the change in a shade value was 4 - 5, and its staining value was 4 when determined in accordance with a testing method using white viscose rayon as prescribed in Japanese Industrial Standards L-0844 A-4). It was found that little change occurred in the shade of the dyed rayon by the fixing treatment.

EXAMPLE 24

10 parts of a dye expressed by the following formula (15)

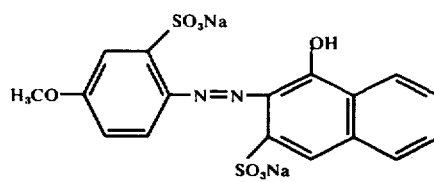

able for dyeing a polyester-cellulose fibre blend, in a single bath at a high temperature.

The dye of formula (15) belonged to class B of the S.D.C., Clasification and was a high-temperature exhaustion type.

Viscose rayon which was dyed using the dye of formula (15) to a normal depth had good light fastness (i.e., the rating value of the dyed rayon was 7 when determined in accordance with a method as prescribed in Japanese Industrial Standards L-0841), and good wash fastness (i.e., the change in a value of shade was 4 - 5 and a staining value was 3 - 4 when determined in accordance with a testing method using white viscose rayon as prescribed in Japanese Industrial Standards L-0844 A-2). Then, the dyed rayon was subjected to a fixing treatment using a polyamine-base fixing agent, Kayafix CD (produced by NIPPON KAYAKU CO., LTD.). The resultant rayon had excellent wash fastness (i.e., the change in a shade value was 4 - 5, and a staining value was 4 when determined in accordance with a testing method using white viscose rayon as prescribed in Japanese Industrial Standards L-0844 A-4). Thus, it was found that little change occurred in the shade of the dyed rayon by the fixing treatment.

EXAMPLE 25

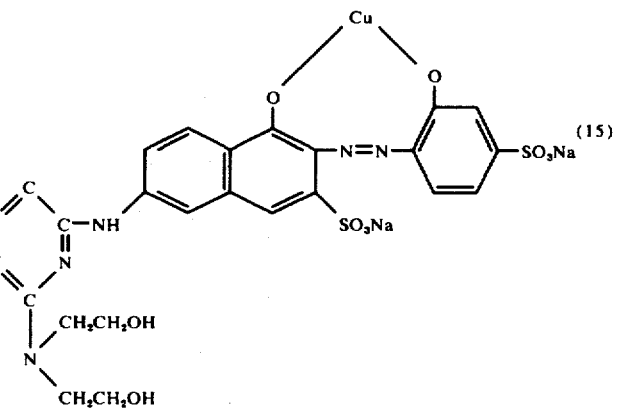

was dissolved in 1000 parts of water. The resultant solution was padded on cuprammonium rayon cloth, 10 parts of a dye expressed by the following formula (16)

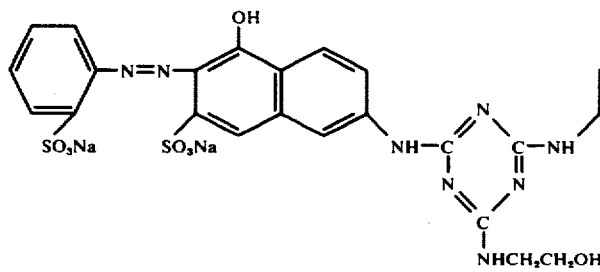

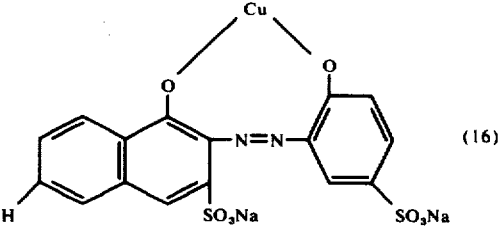

followed by steaming at 103° C for 3 min., washing and drying. The thus dried cupra cloth had a bluish red color and excellent fastness to light and water.

The dye itself had a bluish red color, a high degree of solubility in water (100 g/l) and a high color value. The combination of the dye with a dispersing dye was suitwas dissolved in 340 parts of water and the resultant solution was mixed with 650 parts of a 3% CMC paste and was used to print a cotton broad cloth by a screen printing process. The thus printed cloth was dried at room temperature and was subjected to steaming for 30 min. under a pressure slightly higher than 1 atm.

using saturated steam vapor, and washed and dried. The resultant cloth exhibited a bright red color and had excellent fastness to light and water.

The dye itself had a bluish red color, a high degree of solubility in water (100 g/l) and a high color value. The combination of the dye with a dispersing dye was suitable for dyeing a polyester-cellulose fibre blend, in a single bath at a high temperature.

The dye of formula (16) belonged to class B of the S.D.C., Clasification and was a high-temperature exhaustion type.

Viscose rayon which was dyed using the dye of formula (16) to a normal depth had good light fastness (i.e., the rating value of the dyed rayon was 7 when determined in accordance with a method as prescribed in Japanese Industrial Standards L-0841), and good wash fastness (i.e., the change in the value of shade was 4 – 5 and the staining value was 4 when determined in accordance with a testing method using white viscose rayon as prescribed in Japanese Industrial Standards L-0844 A-2). Then, the dyed rayon was subjected to a fixing treatment using a polyamine-base fixing agent, Kayafix CD (produced by NIPPON KAYAKU CO., LTD.). The resultant rayon had excellent wash fastness (i.e., the change in a shade value was 4 – 5, and its staining value was 4 – 5 when determined in accordance with a testing method using white viscose rayon as prescribed in Japanese Industrial Standards L-0844 A-4). Thus, it was found that little change occurred in the shade of the dyed rayon by the fixing treatment.

EXAMPLE 26

0.1 part of a dye expressed by the following formula (17)

tion of the dye with a dispersing dye was suitable for dyeing polyester-cellulose fibre blend, in a single bath at a high temperature.

The dye of formula (17) belonged to class B of the S.D.C., Clasification and was a high-temperature exhaustion type.

Viscose rayon which was dyed using the dye of formula (17) to a normal depth had good light fastness (i.e., the rating value of the dyed rayon was 6 when determined in accordance with a method as prescribed in Japanese Industrial Standards L-0841), and good wash fastness (i.e., the change in the shade value was 4 and its staining value was 4 – 5 when determined in accordance with a testing method using white viscose rayon as prescribed in Japanese Industrial Standards L-0844 A-2). Then, the dyed rayon was subjected to a fixing treatment using a polyamine-base fixing agent, Kayafix CD (produced by NIPPON KAYAKU CO., LTD.). The resultant rayon had excellent wash fastness (i.e., the change in the shade value was 4 – 5, and its staining value was 4 – 5 when determined in accordance with a testing method using white viscose rayon as prescribed in Japanese Industrial Standards L-0844 A-4). Thus, it was found that little change occurred in the shade of the dyed rayon by the fixing treatment.

EXAMPLE 27

3.7 parts of cyanuric chloride was introduced into 50 parts of ice water and 0.1 part of Liponox RNA (a non-ionic active agent produced by Lion Fat & Oil Co., Ltd.) with violent agitation to form a dispersion. To the dispersion was added, dropwise, a solution, which was obtained by dissolving in 150 parts of neutral water 8.46 parts of an aminoazo compound expressed by the

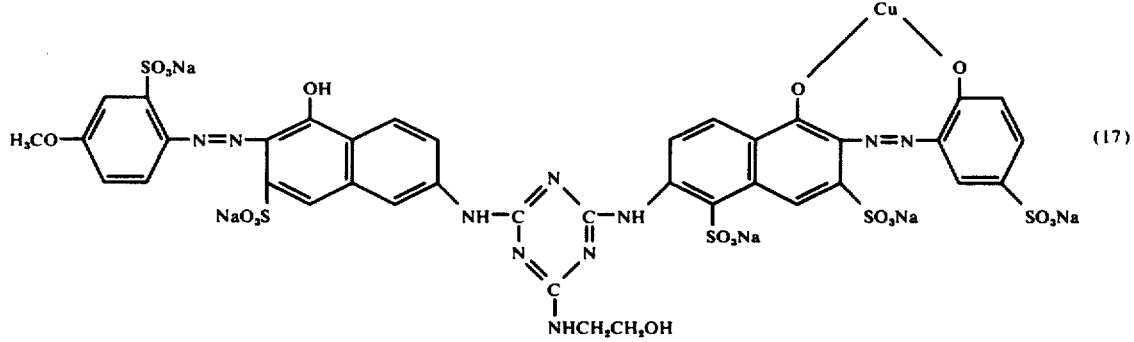

and 0.6 parts of calcined Glauber's salt were dissolved in 800 parts of water at 25° C. To the resultant solution was added 30 parts of L.B.KP. (bleached kraft pulp of hard wood, 310 cc. C.S.F. of beating degree). Thereafter, water was added to the solution to make the total amount 1000 parts. The bath was agitated for 20 min. while maintaining the temperature at 25° C. Then 0.3 parts of RF size 880 (a rosin-derivatives base size produced by Hamano Kogyo K. K.) were added. The resultant solution was agitated for 10 min. and 0.9 parts of crystalline aluminum sulfate were then added followed by agitation for 20 min. The thus dyed pulp was formed into paper by a conventional process with use using a TAPPI Standard Sheet Machine and dried to obtain red paper sheets which had excellent fastness to light and water.

The dye itself had a bluish red color, high solubility in water (100 g/l) and a high color value. The combinafollowing formula (18)

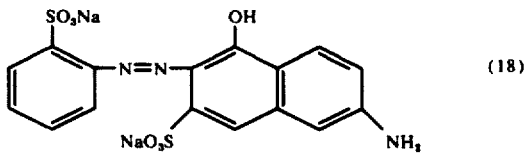

at a reaction temperature of 0° – 5° C over a period of 30 to 60 min. At the same time, a 10% sodium carbonate solution was, added dropwise into the reaction solution to maintain the pH value at 3 – 6. The reaction was continued at 0° – 5° C for several hours until unreacted aminoazo compound became undetectable. Then, a solution, which was obtained by dissolving under neutral conditions in 150 parts of hot water 9.06 parts of an aminoazo compound having the following formula (19)

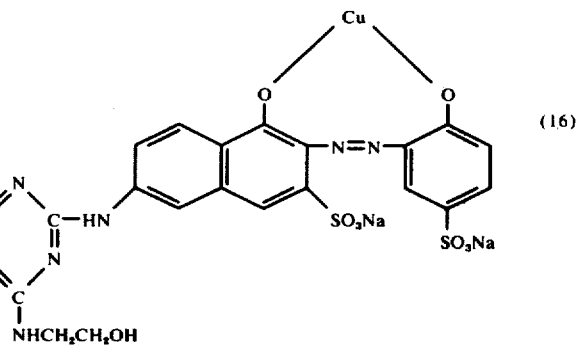

(16)

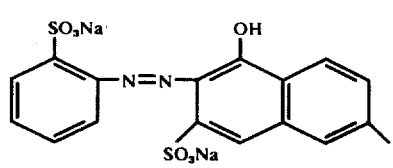

(19)

was added to the reaction solution, the temperature of which was raised to 50° C. At the same time, a 10% sodium carbonate solution was added dropwise to the reaction solution to maintain the pH value at 3 – 6 and the reaction temperature was maintained at 50° C. When unreacted aminoazo compound of formula (19) was no longer detectable, 3.7 parts of monoethanolamine was added to the reaction solution for reaction at 90° – 95° C for 3 hours. To the reaction solution was further added sodium chloride to salt out the dye product, which was in turn was separated by filtration. The thus separated cake-like product was introduced into 400 parts of water and dispersed. The resultant dispersion was heated to 95° C and mixed with a solution composed of 5.5 parts of crystalline copper sulfate, 30 parts of warm water and 6.1 parts of monoethanolamine for reaction at 95° C for 3 – 4 hours. After completion of formation of the copper complex salt, sodium chloride was added to the reaction system to salt out the dye, which was filtered, dried and pulverized to obtain a dark red powdered compound of formula (16)

The dye when dissolved in water gave a yellowish red color and showed a maximum absorbance at 519 m$\mu$ (when observed in a 10% pyridine aqueous solution). The dye was readily soluble in water and had excellent dyeing affinity for cellulose materials. Accordingly, the dye was capable of satisfactorily dyeing natural or regenerated cellulose materials such as cotton, viscose or staple fibre, or paper with a yellowish red color. The resultant dyed material had excellent wet fastness, i.e., spun rayon cloth which was dyed with a heavy shade and fixed with Kayafix CD passed the test of the JIS L 0844 A-4 method. Furthermore, the dye had various excellent properties: optimum fastness to perspiration, excellent fastness to light, small or no discoloration by fixing treatments, and excellent suitability for high temperature dyeing. Thus, the dye was usable as a wet-fast red dye suitable for use as one of the primary colors.

Furthermore, when the above process was repeated substituting cyanuric bromide for the cyanuric chloride, the same dye was obtained.

EXAMPLES 28 to 49

The same procedure as in Example 27 was repeated using various different starting materials, to produce the dyes shown in Table 2. Furthermore, the hue of each dye thus obtained was determined in the same manner as in Examples 23 to 26. The results are shown in Table 2 below.

Table 2

General Formula of Dyes

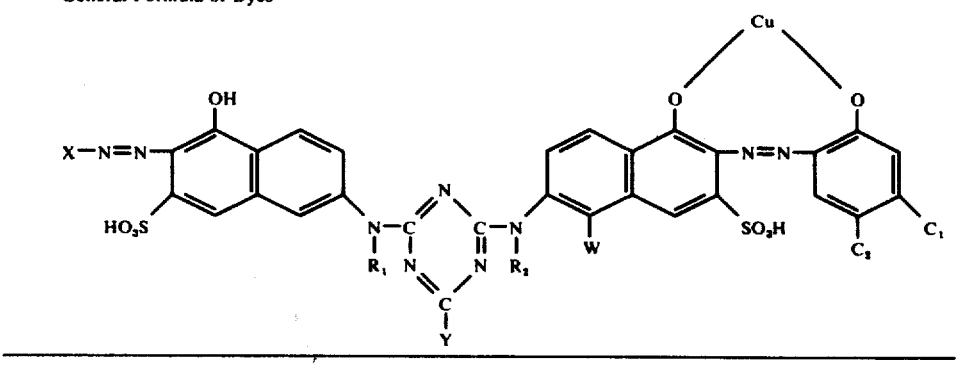

| Substituent Ex. No. | X | Y | $C_1$ | $C_2$ | W | $R_1$ | $R_2$ | Hue |
|---|---|---|---|---|---|---|---|---|
| 28 | 2-SO₃Na-phenyl | —NHCH₂CH₂OH | —H | —SO₃Na | —H | —CH₃ | —H | Red |
| 29 | 2-SO₃Na-phenyl | —NHCH₂CH₂OH | —SO₃Na | —H | —H | —H | —H | Yellowish Red |
| 30 | 2-SO₃Na-phenyl | —NHCH₂CH₂OH | —H | —SO₃Na | —H | —H | —CH₃ | Red |
| 31 | 2-SO₃Na-phenyl | —NHCH₃ | —H | —SO₃Na | —H | —H | —H | Yellowish Red |
| 32 | 2-SO₃Na-phenyl | —NHCH₂CH₂OH | —H | —SO₃Na | —SO₃H | —H | —H | Yellowish Red |
| 33 | phenyl | —NHCH₂CH₂OH | —H | —SO₃Na | —H | —H | —H | Red |
| 34 | 4-SO₃Na-3-CH₃-phenyl | —N(CH₃)(phenyl) | —H | —SO₃Na | —H | —H | —H | Red |
| 35 | 4-CH₃-5-NO₂-2-SO₃Na-phenyl | —N(CH₂CH₂OH)₂ | —H | —SO₃Na | —H | —H | —H | Bluish Red |
| 36 | 4-CH₃-5-OCH₃-2-SO₃Na-phenyl | —NH-(3-SO₃Na-phenyl) | —H | —SO₃Na | —H | —CH₃ | —H | Bluish Red |
| 37 | 4-CH₃-phenyl | —O-phenyl | —H | —SO₃Na | —H | —H | —H | Red |

-continued

| Substituent Ex. No. | X | Y | $C_1$ | $C_2$ | W | $R_1$ | $R_2$ | Hue |
|---|---|---|---|---|---|---|---|---|
| 38 | 5-chloro-2-methyl-benzene-sulfonate (Cl, SO₃Na substituted phenyl) | —NHCH₂CH₂OH | —SO₃Na | —H | —H | —H | —CH₃ | Red |
| 39 | 4-nitro-stilbene-2,2'-disulfonate (O₂N, SO₃Na, NaO₃S substituted stilbene) | —N(CH₂CH₂OH)₂ | —H | —SO₃Na | —H | —H | —H | Rubine |
| 40 | 2-methyl-6-sulfo-benzothiazolyl-phenyl (SO₃Na, H₃C, S, N substituted) | —NHC₂H₅ | —H | —SO₃Na | —H | —H | —H | Rubine |
| 41 | 4-sulfo-naphthyl (NaO₃S substituted naphthalene) | —NH—C₆H₄—CH₃ | —H | —SO₃Na | —H | —H | —H | Bordeaux |
| 42 | 6-sulfo-naphthyl (NaO₃S substituted naphthalene) | —N(morpholino) | —H | —SO₃Na | —H | —H | —H | Bordeaux |
| 43 | 4,4'-disulfo-azobenzene-2-methyl (NaO₃S, N=N, SO₃Na substituted) | NHCH₂CH₂OH | —H | —SO₃Na | —H | —H | —H | Rubine |
| 44 | 2-methyl-benzene-sulfonate (SO₃Na substituted phenyl) | —NHCH₂CH₂OH | —SO₃Na | —H | —H | —H | —H | Yellowish Red |
| 45 | 3-sulfo-phenyl (NaO₃S substituted phenyl) | —NH—C₆H₄—OC₂H₅ | —H | —SO₃Na | —H | —H | —H | Yellowish Red |
| 46 | 4-ethoxy-2-methyl-benzene sulfonate (H₅C₂O, SO₃Na substituted phenyl) | —N(CH₃)₂ | —H | —SO₃Na | —H | —H | —H | Bluish Red |
| 47 | 4-ethyl-2-methyl-benzene sulfonate (H₅C₂, SO₃Na substituted phenyl) | —NH—C₆H₄—OCH₃ | —H | —SO₃Na | —H | —H | —H | Bluish Red |

-continued

| Substituent Ex. No. | X | Y | $C_1$ | $C_2$ | W | $R_1$ | $R_2$ | Hue |
|---|---|---|---|---|---|---|---|---|
| 48 | 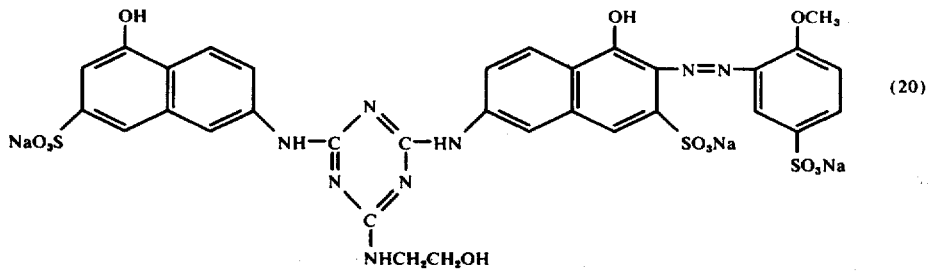 | —NHCH$_2$CH$_2$OH | —H | —SO$_3$Na | —H | —H | —H | Bordeaux |
| 49 | | —NHCH$_2$CH$_2$OH | —H | —SO$_3$Na | —H | —H | —H | Rubine |

EXAMPLE 50

The procedure of Example 27 was repeated except that 9.06 parts of the aminoazo compound of the aforementioned formula (19) was used instead of the aminoazo compound of formula (18) and 4.78 parts of 6-amino-1-naphthol-3-sulfonic acid was used instead of the aminoazo compound of formula (19), to obtain a reaction solution containing 16.6 parts of a compound having the following formula (20)

solution was reacted at 10° C for 3 hours at a pH value of 7 – 8. Thereafter, the reaction solution was further agitated overnight at room temperature, and then treated with a copper-yielding agent in the same manner as in Example 27 to obtain the same dye as in Example 27.

EXAMPLES 51 – 69

The same procedure as in Example 50 was repeated using various different starting materials, to produce (20)

To the reaction solution was added ice to cool the solution to 10° C and a diazo solution, which was obtained from 3.46 parts of aniline-2-sulfonic acid. The the respective dyes as indicated in Table 3. Furthermore, the hue of each dye thus obtained was determined in the same manner as in Examples 23 to 26. The results are shown in Table 3.

Table 3

General Formula of Dyes

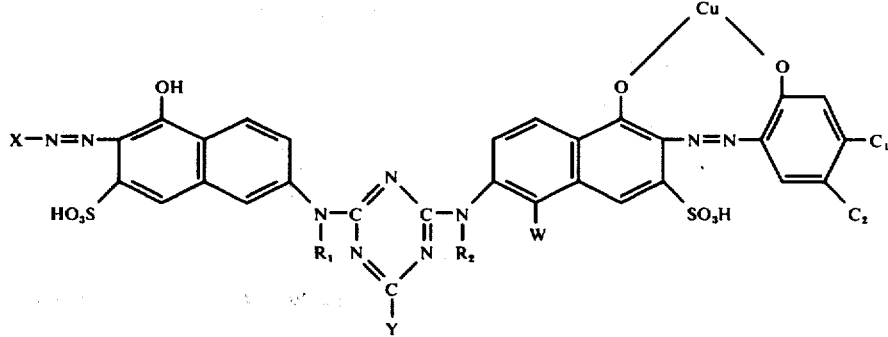

| Substituent Ex. No. | X | Y | $C_1$ | $C_2$ | W | $R_1$ | $R_2$ | Hue |
|---|---|---|---|---|---|---|---|---|
| 51 | 2-(SO₃Na)-phenyl | −NHCH₂CH₂OH | −H | −SO₃Na | −H | −CH₃ | −H | Red |
| 52 | 2-(SO₃Na)-phenyl | −NHCH₂CH₂OH | −SO₃Na | −H | −H | −H | −H | Yellowish Red |
| 53 | 2-(SO₃Na)-phenyl | −NHCH₂CH₂OH | −H | −SO₃Na | −H | −H | −CH₃ | Red |
| 54 | 2-(SO₃Na)-phenyl | −NHCH₃ | −H | −SO₃Na | −H | −H | −H | Yellowish Red |
| 55 | 2-(SO₃Na)-phenyl | −NHCH₂CH₂OH | −H | −SO₃Na | −SO₃H | −H | −H | Yellowish Red |
| 56 | phenyl | −NHCH₂CH₂OH | −H | −SO₃Na | −H | −H | −H | Red |
| 57 | 4-(H₂NO₂S)-phenyl | −NH-(5-SO₃Na-naphth-1-yl) | −H | −SO₃Na | −H | −H | −H | Yellowish Red |
| 58 | 4-Cl-phenyl | −NHCH₃ | −H | −SO₃Na | −H | −H | −H | Red |
| 59 | 4-(NaOOC)-phenyl | −NHCH₂CH₂OH | −H | −SO₃Na | −H | −H | −H | Yellowish Red |
| 60 | 4-CH₃-3-(NaO₃S)-phenyl | −NH-(3-Cl-phenyl) | −H | −SO₃Na | −H | −H | −H | Red |
| 61 | 4-CH₃O-2-(SO₃Na)-phenyl | −NHCH₂CH₂SO₃Na | −H | −SO₃Na | −H | −H | −CH₃ | Bluish Red |

-continued

| Substituent Ex. No. | X | Y | $C_1$ | $C_2$ | W | $R_1$ | $R_2$ | Hue |
|---|---|---|---|---|---|---|---|---|
| 62 | 2,5-dimethyl-4-sulfonatophenyl (SO₃Na, H₃C, CH₃) | —N(CH₂CH₂OH)₂ | —H | —SO₃Na | —H | —H | —CH₃ | Bluish Red |
| 63 | 4-(CH₃COHN)-phenyl | —O—C₆H₄—CH₃ | —H | —SO₃Na | —H | —H | —H | Bluish Red |
| 64 | 2-sulfonato-4-(CH₃CONH)-phenyl | —N(CH₃)(C₆H₅) | —H | —SO₃Na | —H | —CH₃ | —H | Bluish Red |
| 65 | 2-(4-methylphenyl)-6-methylbenzothiazolyl | —N(morpholino) | —SO₃Na | —H | —H | —H | —H | Rubine |
| 66 | 5-sulfonato-1-naphthyl (NaO₃S-naphthyl) | —NHCH₂CH₂OH | —H | —SO₃Na | —H | —H | —H | Bordeaux |
| 67 | 4,8-disulfonato-6-(2-methylphenylazo)-2-naphthyl | —NH₂ | —H | —SO₃Na | —H | —H | —H | Rubine |
| 68 | 3-sulfonatophenyl | —NHC₃H₇ | —H | —SO₃Na | —H | —H | —H | Yellowish Red |
| 69 | 4-ethoxy-2-sulfonatophenyl (H₃C₂O—, SO₃Na) | —NH—C₆H₄—C₂H₅ | —H | —SO₃Na | —H | —H | —H | Bluish Red |

EXAMPLE 70

The same procedure as in Example 27 was repeated except that 4.78 parts of 6-amino-1-naphthol-3-sulfonic acid was used instead of the aminoazo compound of formula (18) and 8.46 parts of the aminoazo compound of formula (18) instead of the aminoazo compound of formula (19), to obtain a reaction solution containing 16 parts of a compound expressed by the following formula (21)

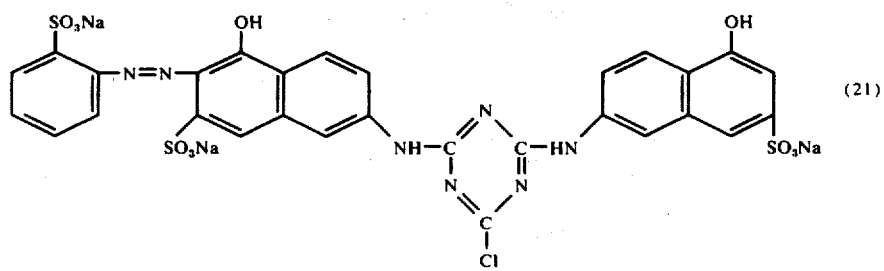

(21)

To the reaction solution was added ice to cool the solution to 10° C and a diazo solution which was obtained from 4.06 parts of 2-methoxyaniline-5-sulfonic acid. The resultant solution was agitated for reaction at 10° C for 3 hours at a pH value of 7-8, and further agitated at room temperature overnight for to complete the coupling reaction. Thereafter, the same procedure as in Example 27 was repeated using monoethanolamine and the copper-yielding agent to obtain a dye having the same structure as that of Example 27.

EXAMPLES 71 – 87

The same procedure as in Example 70 was repeated using various different starting materials, to produce the dyes as shown in Table 4. The hue of each dye was determined in the same manner as in Examples 23 to 26. The results are shown in Table 4.

Table 4

General Formula of Dyes

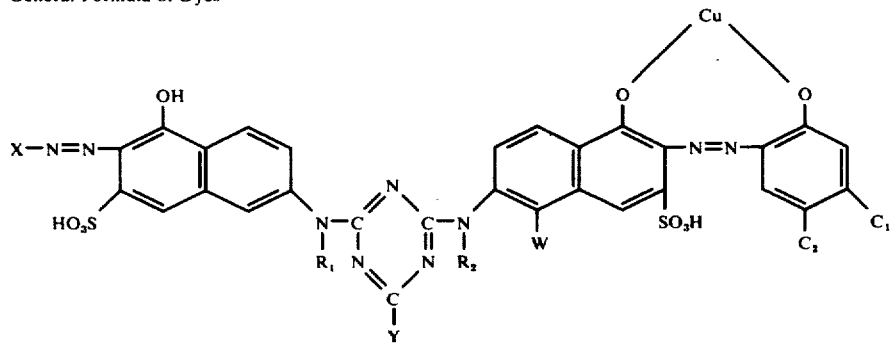

| Substituent Example No. | X | Y | $C_1$ | $C_2$ | W | $R_1$ | $R_2$ | Hue |
|---|---|---|---|---|---|---|---|---|
| 71 | ⌬-SO₃Na (ortho) | —NHCH₂CH₂OH | —H | —SO₃Na | —H | —CH₃ | —H | Red |
| 72 | ⌬-SO₃Na (ortho) | —NHCH₂CH₂OH | —SO₃Na | —H | —H | —H | —H | Yellowish Red |
| 73 | ⌬-SO₃Na (ortho) | —NHCH₂CH₂OH | —H | —SO₃Na | —H | —H | —CH₃ | Red |
| 74 | ⌬-SO₃Na (ortho) | —NHCH₃ | —H | —SO₃Na | —H | —H | —H | Yellowish Red |

-continued
| Substituent Example No. | X | Y | $C_1$ | $C_2$ | W | $R_1$ | $R_2$ | Hue |
|---|---|---|---|---|---|---|---|---|
| 75 | 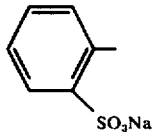 | 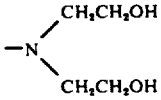 | —H | —SO₃Na | —H | —H | —H | Yellowish Red |
| 76 | 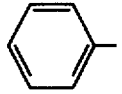 | —NHCH₂CH₂OH | —H | —SO₃Na | —H | —H | —H | Red |
| 77 |  | —NHCH₂CH₂OH | —SO₃Na | —H | —H | —H | —H | Yellowish Red |
| 78 | 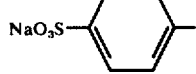 | 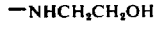 | —H | —SO₃Na | —H | —H | —H | Red |
| 79 | 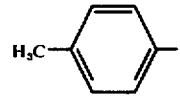 | 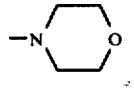 | —H | —SO₃Na | —H | —H | —H | Red |
| 80 | 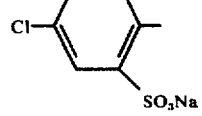 | —NHC₂H₅ | —H | —SO₃Na | —H | —CH₃ | —H | Bluish Red |
| 81 | 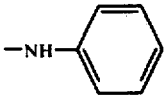 | 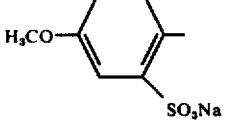 | —SO₃Na | —H | —H | —H | —H | Bluish Red |
| 82 |  | 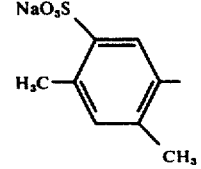 | —H | —SO₃Na | —H | —H | —H | Bluish Red |
| 83 | 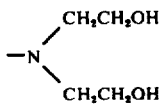 | —NHCH₂COOH | —H | —SO₃Na | —H | —H | —H | Red |
| 84 | 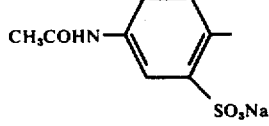 | 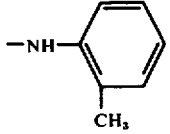 | —SO₃Na | —H | —H | —H | —H | Rubine |
| 85 | 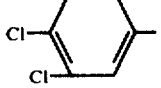 | —NHCH₂CH₂OH | —H | —SO₃Na | —H | —H | —CH₃ | Rubine |

-continued

| Substituent Example No. | X | Y | $C_1$ | $C_2$ | W | $R_1$ | $R_2$ | Hue |
|---|---|---|---|---|---|---|---|---|
| 86 | 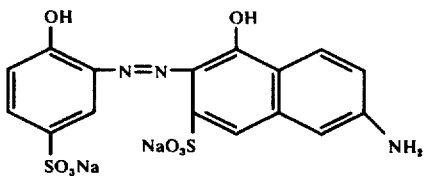 | $-NHCH_2CH_2OH$ | $-H$ | $-SO_3Na$ | $-H$ | $-H$ | $-H$ | Rubine |
| 87 | 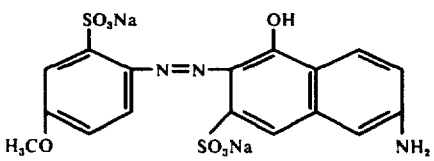 | $-NHCH_2CH_2OH$ | $-H$ | $-SO_3Na$ | $-H$ | $-H$ | $-H$ | Red |

EXAMPLE 88

The same procedure as in Example 27 was repeated except that 10.03 parts of a copper-containing aminoazo compound, which was obtained by treating an aminoazo compound having the following formula (22) with a copper yielding agent ![Formula 22]

(22)

by a conventional method, was used instead of the aminoazo compound of formula (18), and 4.78 parts of 6-amino-1-naphthol-3-sulfonic acid was used instead of the aminoazo compound of formula (19). The resultant condensate was subjected to a coupling reaction with the diazonium salt obtained from aniline-2-sulfonic acid, and the coupled product was condensed with 3.7 parts of monoethanolamine to obtain a dye having the same structure as that produced in Example 27.

EXAMPLE 89

3.7 parts of cyanuric chloride was introduced into a mixture of 50 parts of ice water and 0.1 part of Liponox RNA (a non-ionic active agent produced by Lion Fat & Oil Co., Ltd.) with vigorous agitation for dispersing. To the dispersion was added dropwise a solution, which was obtained by dissolving in 150 parts of neutral warm water 9.06 parts of an aminoazo compound having the following formula (23)

![Formula 23]

(23)

for reaction at a temperature of 0° – 5° C over a period of 30 min. At the same time, a 10% sodium carbonate solution was added dropwise to the reaction solution to maintain the pH value at 3 – 7. In this manner, the reaction was continued at 0° – 5° C for several hours until unreacted aminoazo compound was no longer detectable. Then, 11.62 parts of a copper-containing aminoazo compound, which was obtained by treating with copper sulfate a coupling product of a diazocompound of 2-hydroxylaniline-5-sulfonic acid and of 6-amino-1-naphthol-3, 5-disulfonic acid, and which is expressed by the following formula (24)

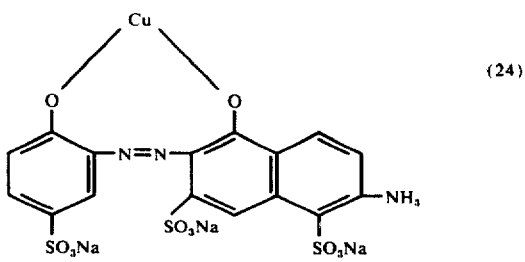

(24)

was dissolved in 140 parts of neutral warm water. The solution was added to the reaction system, to raise the temperature of the system to 50° C. At the same time, a 10% sodium carbonate solution was added to the system to maintain the pH value at 3 – 6 while keeping the temperature at 50° C. When unreacted aminoazo compound of formula (24) was no longer detectable, 3.7 parts of monoethanolamine was added to the reaction system for reaction at 90° – 95° C for 3 hours, to which sodium chloride was added to salt out the product. The product was then separated by filtration, dried and pulverized to obtain a dark reddish brown powdered compound having the following formula (17)

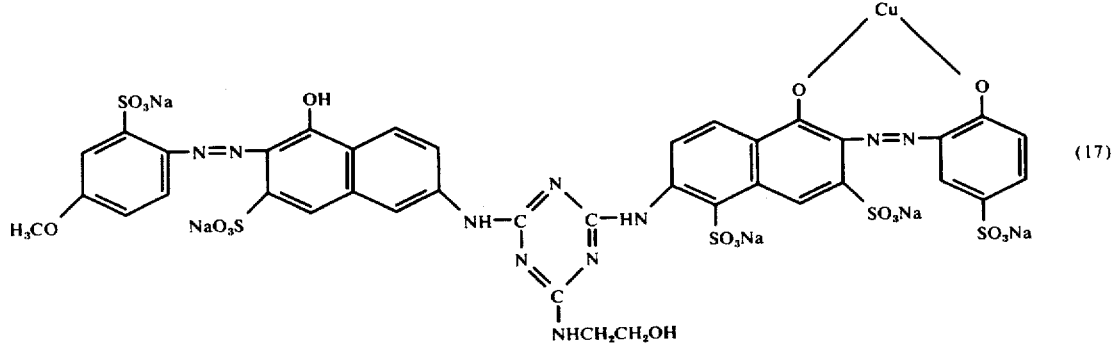

(17)

When the dye or compound was dissolved in water, the solution gave a bluish red color and the dye had a maximum absorbance at 520 mµ (when observed in a 10% pyridine aqueous solution.) The dye had excellent solubility in water and belonged to B group of SDC classification. The use of the dye in accordance with a conventional dyeing process resulted in a natural or regenerated cellulose such as cotton, viscose or staple fibre or paper dyed in a vivid red color. The resultant dyed material had excellent wet fastness, i.e., spun rayon cloth which was dyed to a heavy shade and fixed with Kayafix CD, passed the test of JIS L 0844 A-4. Furthermore, the dye had various other excellent properties: optimum fastness to perspiration, excellent fastness to light, little or no discoloration by fixing treatments, excellent suitability for high temperature dyeing. Thus, the dye was usable as a wet-fast red dye suitable for use as one of the primary colors. When the above process was repeated using cyanuric bromide instead of cyanuric chloride, the same dye was obtained.

EXAMPLES 90 – 106

The same procedure as in Example 89 was repeated using various different starting materials, thereby producing the dyes shown in Table 5. The hue of each dye thus obtained was determined in the same manner as in Examples 23 to 26. The results are shown in Table 5.

Table 5

General Formula of Dyes

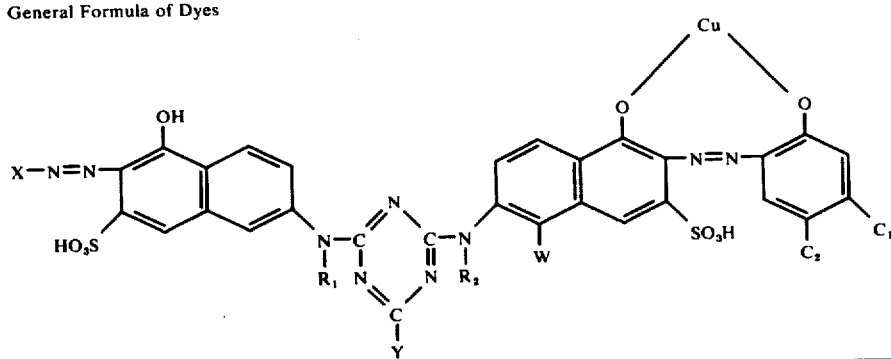

| Substituent Ex. No. | X | Y | C₁ | C₂ | W | R₁ | R₂ | Hue |
|---|---|---|---|---|---|---|---|---|
| 90 | phenyl | —NHCH₂CH₂OH | —H | —SO₃Na | —SO₃Na | —H | —H | Yellowish Red |
| 91 | H₃CO-/-SO₃Na phenyl | —NHCH₂CH₂OH | —H | —SO₃Na | —SO₃Na | —CH₃ | —H | Bluish Red |

-continued

| Substituent Ex. No. | X | Y | $C_1$ | $C_2$ | W | $R_1$ | $R_2$ | Hue |
|---|---|---|---|---|---|---|---|---|
| 92 | 4-H₃CO, 2-SO₃Na phenyl | —NHCH₂CH₂OH | —SO₃Na | —H | —SO₃Na | —H | —H | Red |
| 93 | 4-H₃CO, 2-SO₃Na phenyl | —NHCH₂CH₂OH | —H | —SO₃Na | —SO₃Na | —H | —CH₃ | Bluish Red |
| 94 | 4-H₃CO, 2-SO₃Na phenyl | —NHCH₃ | —H | —SO₃Na | —SO₃Na | —H | —H | Red |
| 95 | 2-SO₃Na phenyl | —NH-phenyl | —H | —SO₃Na | —SO₃Na | —H | —H | Yellowish Red |
| 96 | 4-CH₃ phenyl | —N-morpholino | —H | —SO₃Na | —SO₃Na | —H | —H | Yellowish Red |
| 97 | 4-NaO₃S, 3-CH₃ phenyl | —NH₂ | —H | —SO₃Na | —SO₃Na | —H | —H | Yellowish Red |
| 98 | 3-Cl, 4-SO₃Na phenyl | —N(CH₂CH₂OH)₂ | —SO₃Na | —H | —SO₃Na | —H | —H | Yellowish Red |
| 99 | 3,4-diCl phenyl | —NH-(3-SO₃Na phenyl) | —H | —SO₃Na | —SO₃Na | —CH₃ | —H | Yellowish Red |
| 100 | 4-O₂N, 2-SO₃Na phenyl | —N(CH₃)-phenyl | —H | —SO₃Na | —SO₃Na | —H | —H | Red |
| 101 | 5-H₃C-benzothiazol-2-yl (4-phenyl) | —O-phenyl | —H | —SO₃Na | —SO₃Na | —H | —H | Bluish Red |

-continued

| Substituent Ex. No. | X | Y | $C_1$ | $C_2$ | W | $R_1$ | $R_2$ | Hue |
|---|---|---|---|---|---|---|---|---|
| 102 | $O_2N$-C₆H₃(SO₃Na)-CH=CH-C₆H₃(NaO₃S)- | —N(morpholino) | —SO₃Na | —H | —SO₃Na | —H | —H | Bluish Red |
| 103 | NaO₃S-naphthyl- | —NHCH₂CH₂OH | —H | —SO₃Na | —SO₃Na | —H | —H | Bluish Red |
| 104 | NaO₃S-naphthyl- | —NHC₂H₅ | —H | —SO₃Na | —SO₃Na | —H | —H | Bluish Red |
| 105 | NaO₃S-C₆H₄-N=N-C₆H₄- | —N(CH₂CH₂OH)₂ | —H | —SO₃Na | —SO₃Na | —H | —H | Bluish Red |
| 106 | O₂N-C₆H₃(SO₃Na)- | —NHCH₂CH₂OH | —H | —SO₃Na | —SO₃Na | —H | —H | Red |

EXAMPLE 107

By the same procedure as in Example 89, 3.7 parts of cyanuric chloride was condensed with 11.62 parts of the coppercontaining aminoazo compound of formula (24) and then with 4.78 parts of 6-amino-1-naphthol-3-sulfonic acid to obtain a reaction solution containing 18.6 parts of a compound expressed by the following formula (25)

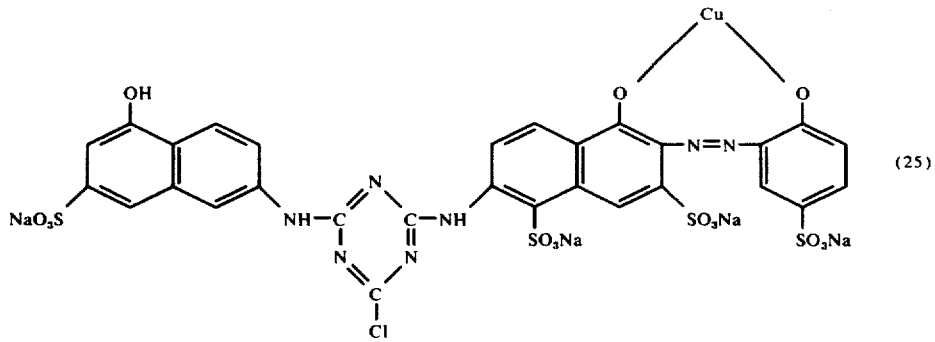

To the reaction solution was added ice to cool the solution to 10° C and a diazo solution which was obtained from 4.06 parts of 4-methoxyaniline-2-sulfonic acid. The resultant solution was agitated for reaction at 10° C for 3 hours at a pH value of 7 – 8, and further agitated at room temperature overnight to complete the coupling reaction. Thereafter, the procedure of Example 89 was repeated using monoethanolamine to obtain a dye having the same structure as that of Example 89.

EXAMPLES 108 – 120

The procedure of Example 107 was repeated using various different starting materials, to produce the dyes shown in Table 6. The hue of each dye thus obtained was determined in the same manner as in Example 23 – 26. The results are shown in Table 6.

Table 6

General Formula of Dyes

Table 6-continued

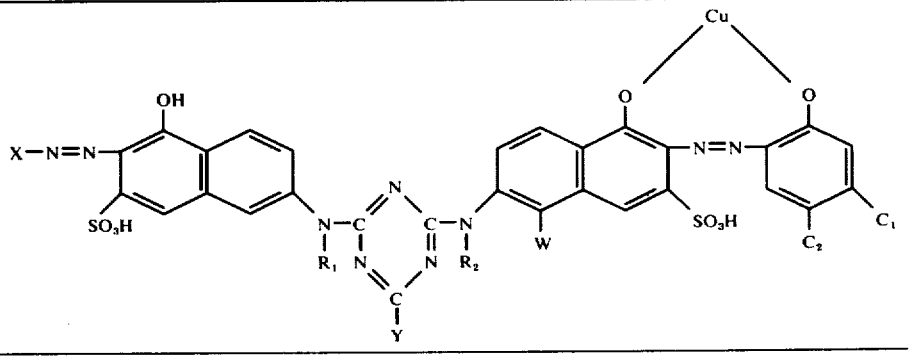

| Substituent Ex. No. | X | Y | $C_1$ | $C_2$ | W | $R_1$ | $R_2$ | Hue |
|---|---|---|---|---|---|---|---|---|
| 108 | phenyl | $-NHCH_2CH_2OH$ | $-H$ | $-SO_3Na$ | $-SO_3Na$ | $-H$ | $-H$ | Yellowish Red |
| 109 | 4-$H_3CO$-2-$SO_3Na$-phenyl | $-NHCH_2CH_2OH$ | $-H$ | $-SO_3Na$ | $-SO_3Na$ | $-CH_3$ | $-H$ | Bluish Red |
| 110 | 4-$H_3CO$-2-$SO_3Na$-phenyl | $-NHCH_2CH_2OH$ | $-SO_3Na$ | $-H$ | $-SO_3Na$ | $-H$ | $-H$ | Red |
| 111 | 4-$H_3CO$-2-$SO_3Na$-phenyl | $-NHCH_2CH_2OH$ | $-H$ | $-SO_3Na$ | $-SO_3Na$ | $-H$ | $-CH_3$ | Bluish Red |
| 112 | 4-$H_3CO$-2-$SO_3Na$-phenyl | $-NHCH_3$ | $-H$ | $-SO_3Na$ | $-SO_3Na$ | $-H$ | $-CH_3$ | Bluish Red |
| 113 | 3-$NaO_3S$-phenyl | $-NH$-phenyl | $-H$ | $-SO_3Na$ | $-SO_3Na$ | $-H$ | $-CH_3$ | Yellowish Red |
| 114 | 4-$H_3CO$-phenyl | $-N(CH_2CH_2OH)_2$ | $-H$ | $-SO_3Na$ | $-SO_3Na$ | $-H$ | $-H$ | Yellowish Red |
| 115 | 4-Cl-2-$SO_3Na$-phenyl | morpholino | $-H$ | $-SO_3Na$ | $-SO_3Na$ | $-H$ | $-H$ | Yellowish Red |

-continued

| Substituent Ex. No. | X | Y | $C_1$ | $C_2$ | W | $R_1$ | $R_2$ | Hue |
|---|---|---|---|---|---|---|---|---|
| 116 | CH₃-phenyl | —NHCH₂CH₂OH | —H | —SO₃Na | —SO₃Na | —CH₃ | —H | Red |
| 117 | CH₃COHN-phenyl-SO₃Na | —N(CH₃)-phenyl | —H | —SO₃Na | —SO₃Na | —H | —H | Red |
| 118 | H₃C-(SO₃Na)-phenyl-S-...-N= | —N(CH₂CH₂OH)₂ | —SO₃Na | —H | —SO₃Na | —H | —H | Bluish Red |
| 119 | naphthyl-SO₃Na | —NHCH₂COOH | —H | —SO₃Na | —SO₃Na | —H | —H | Bluish Red |
| 120 | NaO₃S-phenyl-N=N-phenyl(SO₃Na) | —NHC₂H₅ | —H | —SO₃Na | —SO₃Na | —H | —H | Bluish Red |

EXAMPLE 121

The procedure of Example 89 was repeated except that 4.78 parts of 6-amino-1-naphthol-3-sulfonic acid was used instead of the aminoazo compound of formula (23), to produce a reaction solution containing 19.1 parts of a compound expressed by the following formula (26)

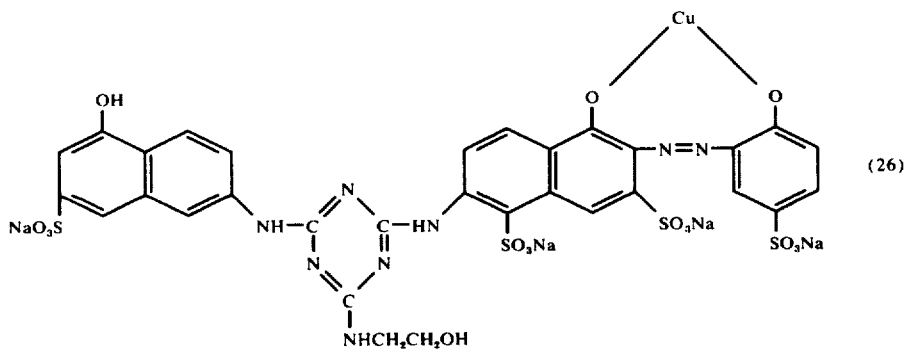

(26)

To the reaction solution was added ice to cool the solution to 10° C and a diazo solution which was obtained from 4.06 parts of 4-methoxyaniline-2-sulfonic acid. The resultant solution was agitated for reaction at 10° C for 3 hours at a pH value of 7 – 8, and further agitated at room temperature overnight to obtain a dye having the same structure as the product of Example 89.

EXAMPLES 122 – 138

The procedure of Example 121 was repeated using various different starting materials, to produce the dyes shown in Table 7. The hue of each dye thus obtained was determined in the same manner as in Example 23 – 26. The results are shown in Table 7.

Table 7

General Formula of Dyes

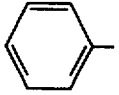

| Substituent Ex. No. | X | Y | $C_1$ | $C_2$ | W | $R_1$ | $R_2$ | Hue |
|---|---|---|---|---|---|---|---|---|
| 122 | 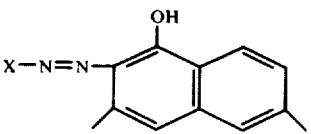 | $-NHCH_2CH_2OH$ | $-H$ | $-SO_3Na$ | $-SO_3Na$ | $-H$ | $-H$ | Yellowish Red |
| 123 | 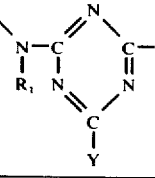 | $-NHCH_2CH_2OH$ | $-H$ | $-SO_3Na$ | $-SO_3Na$ | $-CH_3$ | $-H$ | Bluish Red |
| 124 | 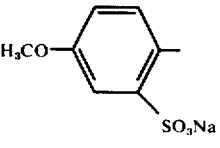 | $-NHCH_2CH_2OH$ | $-SO_3Na$ | $-H$ | $-SO_3Na$ | $-H$ | $-H$ | Red |
| 125 | 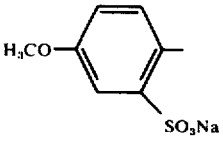 | $-NHCH_3$ | $-H$ | $-SO_3Na$ | $-SO_3Na$ | $-H$ | $-H$ | Red |
| 126 | 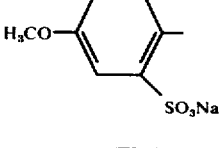 | 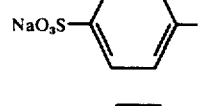 | $-H$ | $-SO_3Na$ | $-SO_3Na$ | $-H$ | $-H$ | Yellowish Red |
| 127 | 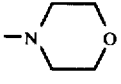 | 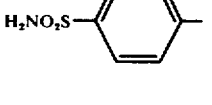 | $-H$ | $-SO_3Na$ | $-SO_3Na$ | $-H$ | $-H$ | Yellowish Red |
| 128 | 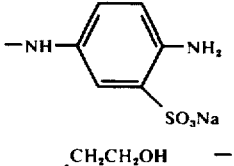 | 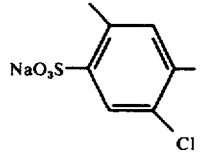 | $-H$ | $-SO_3Na$ | $-SO_3Na$ | $-H$ | $-H$ | Yellowish Red |
| 129 | 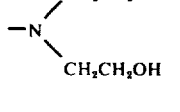 | 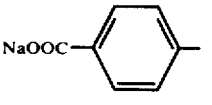 | $-H$ | $-SO_3Na$ | $-SO_3Na$ | $-H$ | $-H$ | Yellowish Red |

-continued
| Substituent Ex. No. | X | Y | C₁ | C₂ | W | R₁ | R₂ | Hue |
|---|---|---|---|---|---|---|---|---|
| 130 | 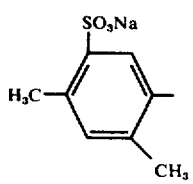 | 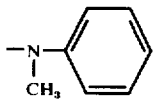 | —H | —SO₃Na | —SO₃Na | —CH₃ | —H | Bluish red |
| 131 | 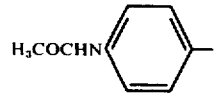 | —NHCH₂CH₂OH | —H | —SO₃Na | —SO₃Na | —H | —H | Red |
| 132 | 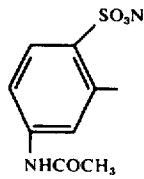 | 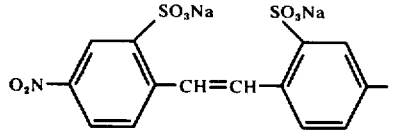 | —SO₃Na | —H | —SO₃Na | —H | —H | Bluish Red |
| 133 | 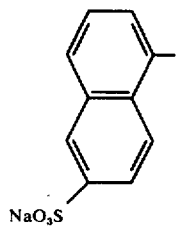 | NHCH₂CH₂OH | —H | —SO₃Na | —SO₃Na | —H | —H | Bluish Red |
| 134 | 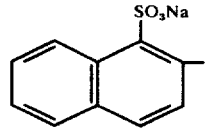 | —NHC₂H₅ | —H | —SO₃Na | —SO₃Na | —H | —CH₃ | Bluish Red |
| 135 | 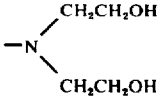 | 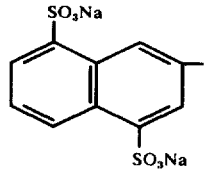 | —H | —SO₃Na | —SO₃Na | —H | —H | Bluish Red |
| 136 | 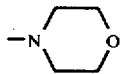 | 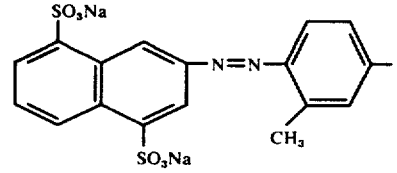 | —H | —SO₃Na | —SO₃Na | —CH₃ | —H | Bluish Red |
| 137 | 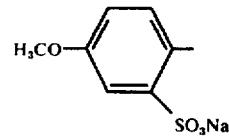 | —NHCH₂CH₂OH | —H | —SO₃Na | —SO₃Na | —H | —H | Bluish Red |
| 138 |  | —NHCH₂CH₂OH | —H | —SO₃Na | —SO₃Na | —H | —CH₃ | Bluish Red |

What is claimed is:
1. An azo dye having the following formula:

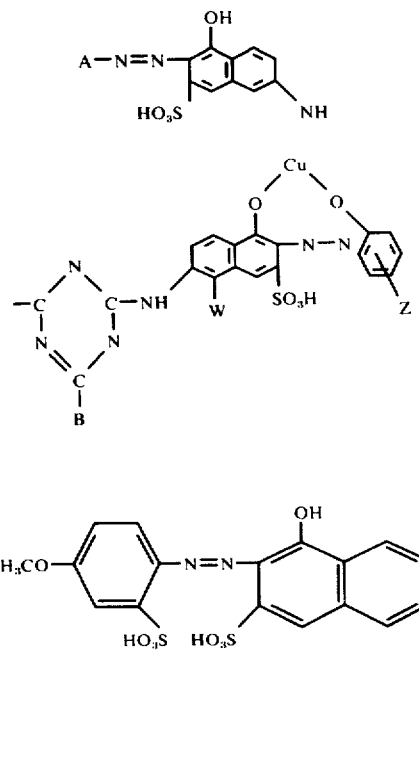

wherein
A is a group selected from 4-methoxy-2-sulfophenyl, 4-methoxy-3-sulfophenyl, 2- or 3-sulfophenyl, tolyl, 4-nitro-2,2'-disulfostilbyl, sulfonaphthyl and 4-(4-sulfophenylazo)-2-sulfophenyl;

B is selected from monoethanolamino, diethanolamino, morpholino, and N-methylamino;

W is hydrogen or sulfonic acid; and

Z is sulfonic acid attached at the meta or para position relative to the pendant diazo.

2. An azo dye according to claim 1 in the form of a sodium, potassium or ammonium salt.

3. An azo dye having the following formula:

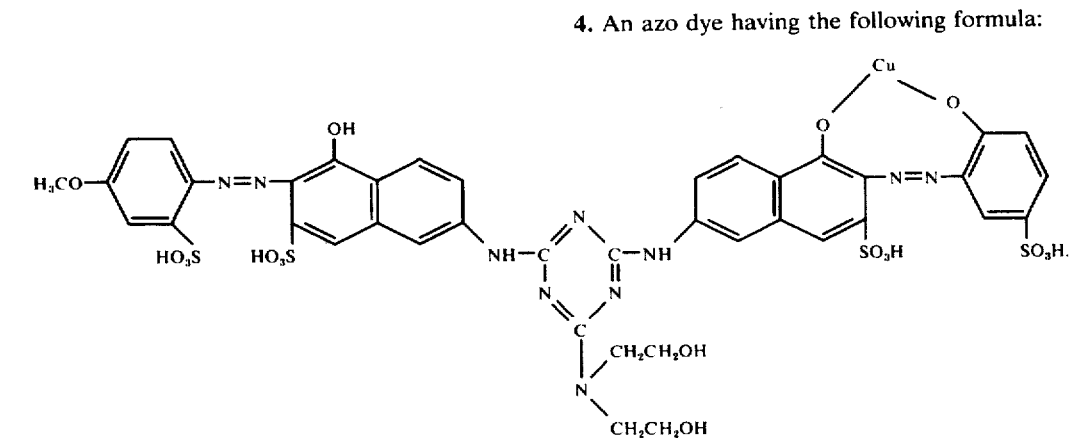

4. An azo dye having the following formula:

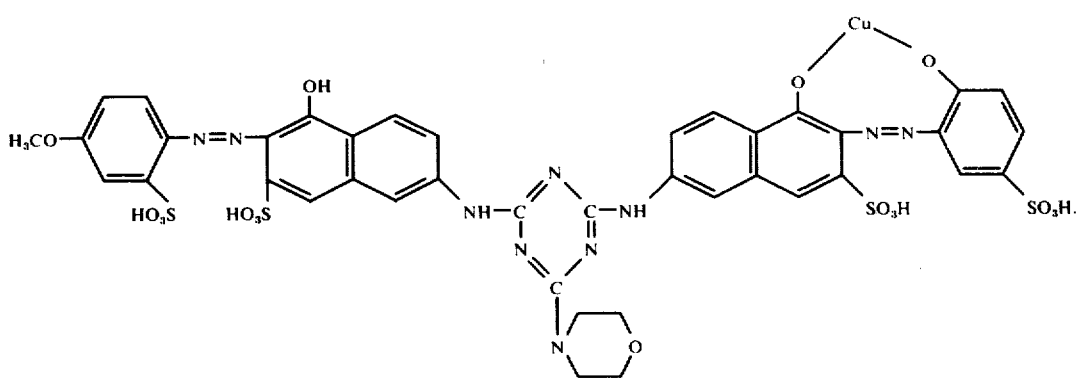

5. An azo dye having the following formula:

6. An azo dye having the following formula:

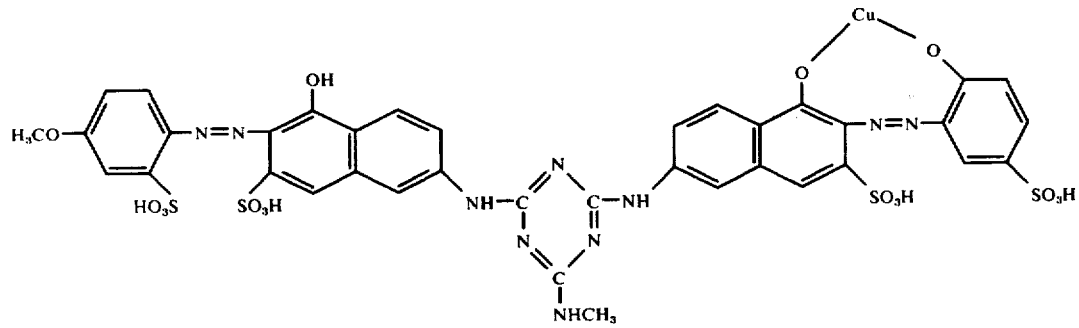
7. An azo dye having the following formula:
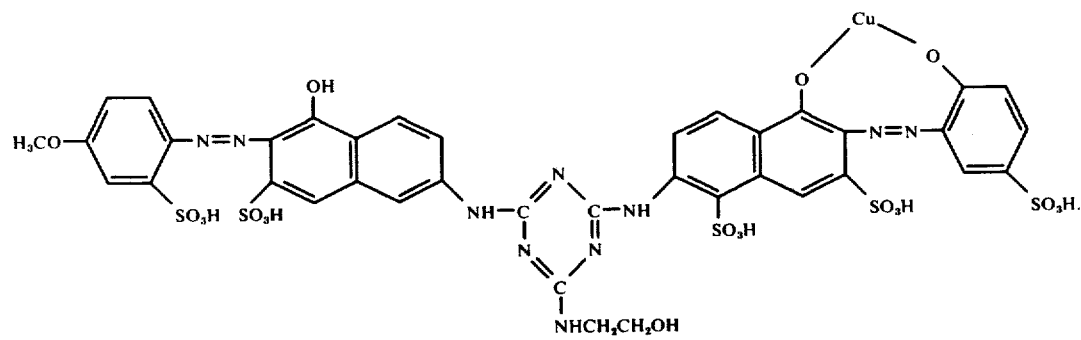
8. An azo dye having the following formula:
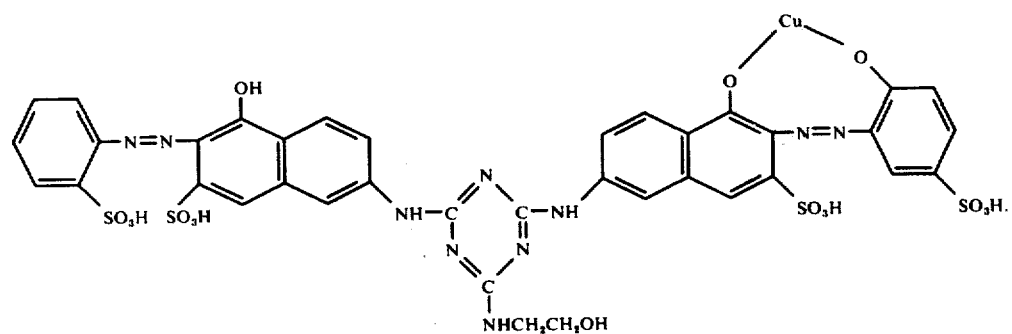
9. An azo dye having the following formula:
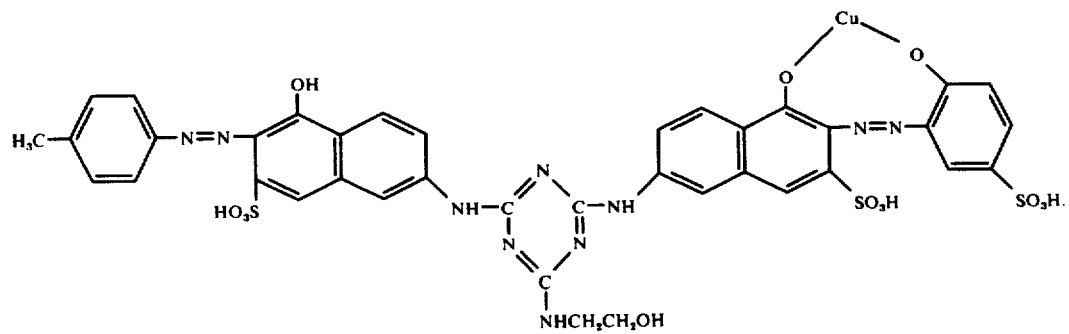
10. An azo dye having the following formula:

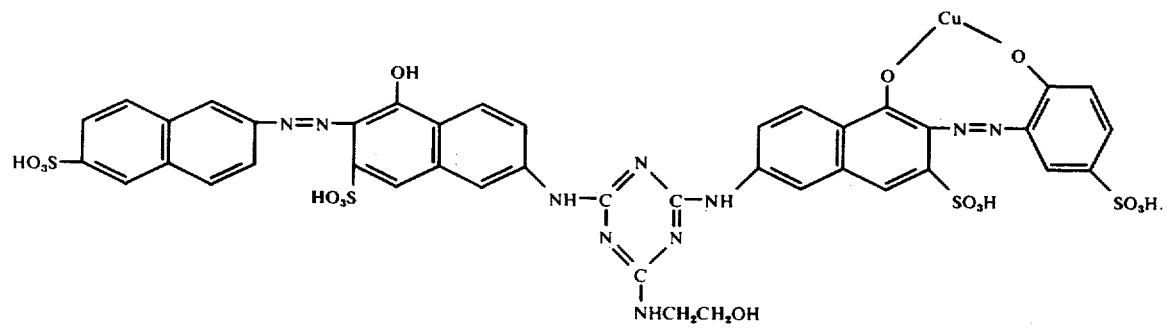
11. An azo dye having the following formula:
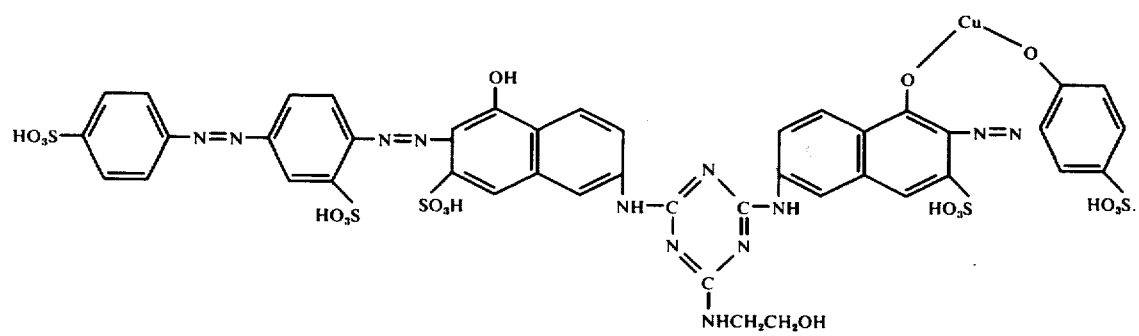
12. An azo dye having the following formula:
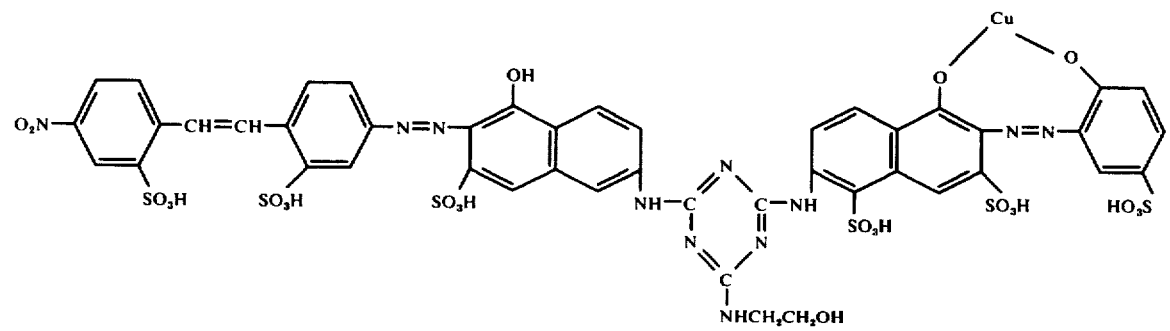
13. An azo dye having the following formula:
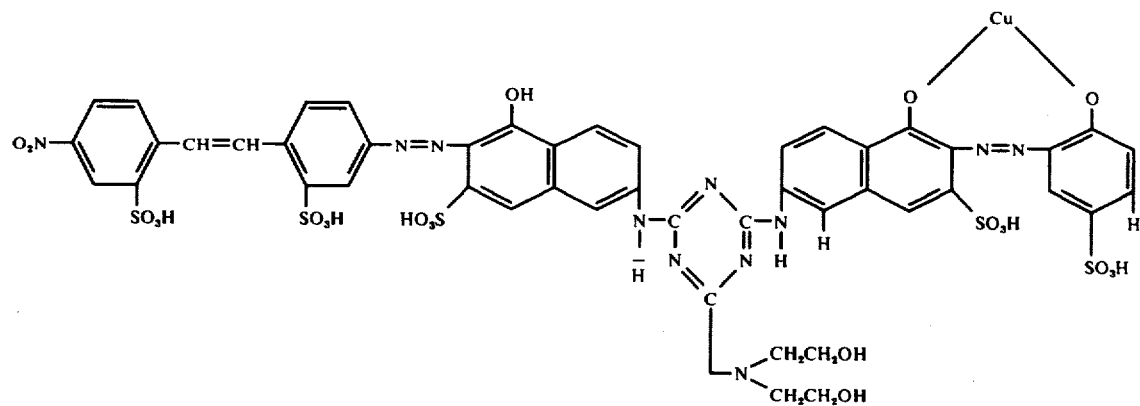
* * * * *